UNITED STATES PATENT OFFICE.

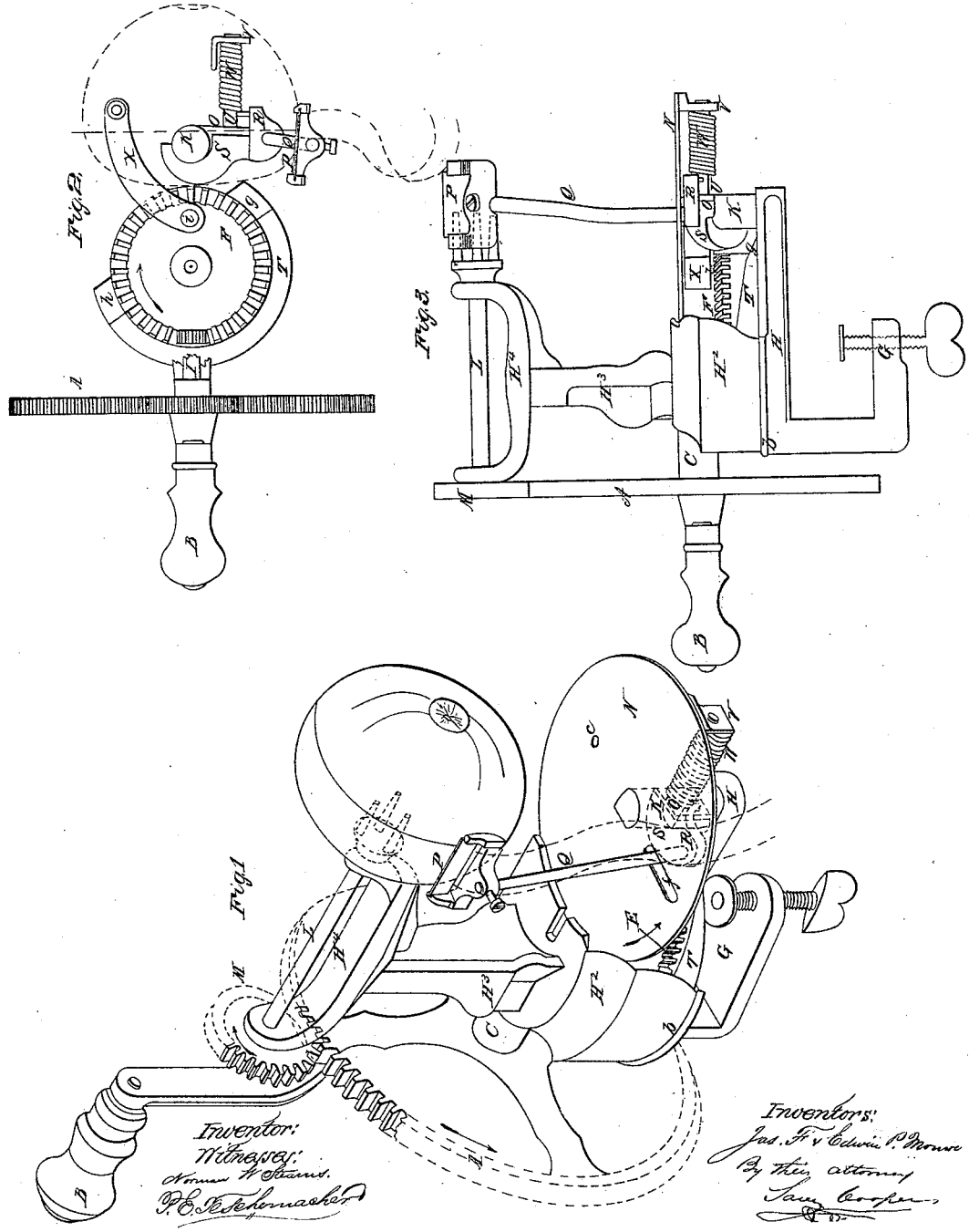

JAMES F. MONROE AND EDWIN P. MONROE, OF FITCHBURG, MASSACHUSETTS

IMPROVED APPLE-PARING MACHINE.

Specification forming part of Letters Patent No. 37,516, dated January 27, 1863.

*To all whom it may concern:*

Be it known that we, JAMES F. MONROE and EDWIN P. MONROE, of Fitchburg, in the county of Worcester and State of Massachusetts, have invented certain Improvements in Machines for Paring Apples, of which the following is a full, clear, and exact description, reference being had to the accompanying drawings, making part of this specification, in which—

Figure 1 is a perspective view; Fig. 2, a plan, the table and the parts above it being removed; Fig. 3, a side elevation.

Our improvements are particularly applicable to that class of apple-parers known as "turn-table machines." These machines, although they are the best now in use, are still liable to some objections, which it is the object of our present improvements to remove. In most of them the operating parts are so exposed that the parings fall upon them and are ground up between the cog-wheels or other moving parts, thus making the machine unsightly, as well as uncleanly, when in use. In other machines of this class the knife interferes with the fork if the crank be turned when there is no apple upon the tines, and thus both the knife and the fork are liable to be broken. In others the knife snaps back after the apple is pared, which makes a disagreeable noise and throws the parings and juice of the fruit round the room.

Our improved machine is free from all these objections; and to enable others skilled in the art to understand our invention, we will proceed to describe the manner in which we have carried it out.

The operating parts are carried by a framework, $H\ H^2\ H^3\ H^4$, which is secured to a table or bench by a clamp, G. From the lower portion, H, of the frame rises the hollow portion $H^2$, which serves to cover and protect the cam-wheel F beneath it, and from this rises the upright portion $H^3$, to the top of which is secured the horizontal portion $H^4$, which carries the shaft I, upon one end of which the apple is sustained in the ordinary manner. The driving-wheel A is secured to a short shaft, C, that runs in a tubular bearing, C, projecting from the frame-work, and carries upon its inner extremity a pinion, D, that engages with the teeth upon the cam-wheel F, by which means the latter is driven. The wheel A also engages with a pinion, M, upon the shaft L, by means of which the apple is revolved. The wheel A is driven by the crank B secured to it. The cam-wheel F revolves upon a short pin, $a$, which rises from the lower bar, H, of the frame. This bar expands into a plate beneath the cam-wheel, which plate unites with the portion $H^2$ of the frame at $b$. In the outer extremity of a bar, H, revolves freely a short post, K, to the top of which is secured the turn-table N, and from one side of which projects an arm, O, which supports the paring-knife and the parts immediately connected with it. This knife P, which does not differ materially from those ordinarily employed upon machines of this description, is secured to the top of an arm, Q, that rises from a block, R, to which is attached the curved arm S, upon which the cam T operates to carry the knife away from the apple. The block R and the arm S are cast or forged in one piece. To one side of the arm S is riveted the shaft U, the opposite end of which turns freely in an ear, V, projecting from the under side of the turn-table N. A coiled spring, W, which surrounds the shaft U, bears one end against the ear V, and the other against the block R in such a manner that it tends constantly to carry the knife toward the apple, and to hold the curved arm S down upon the cam T, when the latter is in position to operate upon it, which is only when the knife is returning after having pared an apple. During the time while the apple is being pared the cam is out of contact with the arm S and the knife is under the control of the spring W. The knife is not permitted to approach so near, however, as to interfere with the fork. The knife-arm Q passes up through a slot, $f$, in the turn-table of sufficient length to allow of the required motions to and from the apple. The turn-table, and with it the knife which is carried by it, is vibrated back and forth to the extent of nearly a semicircle, for the purpose of paring the apple from end to end, by the connecting-rod X, one end of which is connected with the crank-pin $i$, rising from the cam-wheel F, and the other with a pin, $c$, projecting down from the under side of the table N.

It is evident that the cam T, in lieu of operating directly upon the arm S, may bear upon an intermediate lever, which itself actuates the arm.

The operation of the machine is as follows:

The apple being placed upon the fork, as seen in Fig. 1, and the wheel A turned in the direction of its arrow, the operation of paring commences at the instant when the end $g$ of the cam T has passed from beneath the arm S and the knife is at that end of the apple which is nearest to the machine. The spring W now causes the knife to hug the apple, and as the latter is revolved the turn-table is also vibrated by the connecting-rod X, so as to carry the knife gradually to the other end of the apple. While this is taking place the turn-table is being vibrated in the direction of its arrow.

When the operation is completed, the point $h$ of the cam T raises the arm S and carries the knife off from the apple, and the next instant the table begins to vibrate in the opposite direction to bring the knife back ready for a repetition of the operation. It will be observed that the operating parts are all covered up by the frame $H^2$ and the turn-table N, so that at no time can the parings fall upon the gears or other moving parts and be ground or mashed up, but pass off free of the machine into a receptacle below.

What we claim as our invention, and desire to secure by Letters Patent, is—

The combination of the turn-table N with the cam-wheel F, arranged and operating as described, for the purpose specified.

JAMES F. MONROE.
EDWIN P. MONROE.

Witnesses:
H. W. PAGE,
J. Q. BARDEN